July 14, 1970    W. H. BOWEN ET AL    3,520,326
SAFETY RELIEF VALVE WITH PRESSURE COMPENSATING SKIRT
Filed June 27, 1968    2 Sheets-Sheet 1

INVENTORS
HOMER E. FERRILL &
WILLIAM H. BOWEN
BY Daniel Rubin
ATTORNEY

INVENTORS,
HOMER E. FERRILL &
WILLIAM H. BOWEN
BY
ATTORNEY

United States Patent Office 3,520,326
Patented July 14, 1970

3,520,326
SAFETY RELIEF VALVE WITH PRESSURE COMPENSATING SKIRT
William H. Bowen and Homer E. Ferrill, Alexandria, La., assignors to Dresser Industries, Inc., Dallas, Tex., a corporation of Delaware
Filed June 27, 1968, Ser. No. 740,526
Int. Cl. F16k *17/06*
U.S. Cl. 137—477                                                                12 Claims

ABSTRACT OF THE DISCLOSURE

A safety relief valve for the relief of system over-pressure by means of a pressure responsive valve disc movable away from the valve seat to release flow to an outlet thereof. Supported for movement with the disc is an annular skirt ring extending dependent therefrom about the valve seat. The skirt support permits it to assume an operative position relative to the disc at least partially responsive to fluid forces encountered during relief operation of the valve.

BACKGROUND OF THE INVENTION (1) The field of art to which the invention relates includes the art of "Fluid Handling" as contained in Patent Office classification 137.

(2) Safety relief valves for the pressure relief of steam or the like are commonly constructed with a bottom inlet and a single side outlet. A single seat is contained at the terminal end of the inlet and a disc connected to a vertical stem is maintained against the seat for closure by means of a preset spring load being applied thereagainst. An overpressure to be relieved acting against the underside of the disc overcomes the spring force to urge the disc upwardly from the seat to permit overpressured fluid flow toward the outlet. Carried by the disc is a downwardly dependent skirt or collar ring extending about the seat and which functions to aid disc lift after movement thereof has been initiated in effecting pressure relief. Such prior art type safety relief valves are commercially marketed and by way of example are disclosed in patent U.S. 2,850,037 to Van Eysbergen.

Characteristic of these prior art single outlet safety relief valves is the tendency for the disc and supporting stem to be forced from its intended vertical axis in a lateral direction toward the outlet by the encountered forces of high velocity flow acting against the underside of the interferring skirt. Any such axial shift is of course recognized as undesirable since failure to maintain a true axial alignment between disc and the seat results in an uneven reseating during the closure cycle. This improper seating ultimately incurs wear and consequent maintenance to the seat not to mention fluid leakage during periods of shutoff. It is usual therefore in prior safety valves of this type to resist misalignment by employing structures in manufacture affording extremely close guiding clearances for the disc stem. At the same time selected hard facing materials are employed in the seat area to minimize damage. With bevel seat designs, it has been found additionally necessary to permit the disc a degree of lateral movement in order to realign itself with the seat when closing. These prior solutions have therefore all been directed essentially toward tolerating the basic problem of misalignment from the above cause by minimizing its effect without attempting elimination of the problem itself.

Despite therefore the prior approaches in coping with this difficulty only a limited success has been realized for prior valves of this type in overcoming and minimizing damage to the seat surface. While maintenance has been reduced, its frequency has continued significantly high. Accordingly, despite extensive and costly efforts to overcome unwanted seat wear caused as by the above, they have met with only a limited success in achieving the ultimate objective of eliminating the basic problem and its consequences.

SUMMARY

This invention relates to an improvement for a safety relief valve. Specifically the invention relates to an improvement for safety relief valves in which seat wear associated with disc misalignment relative to the seat resulting from side flow of the fluid past the disc skirt is substantially reduced if not completely eliminated. This result is achieved in accordance herewith by employing a frusto-conical skirt ring initially set downwardly depending but incompletely secured to the disc within a frusto-conical annular groove.

In response to the fluid forces acting thereagainst, the skirt will shift, tilt or cock from its initial setting to assume an operative position whereby drag tending to misalign the valve stem is reduced while that which remains becomes completely pressure compensated. Accordingly, by means hereof the acting pressure tends to cock the skirt to an axial relation offset from the disc axis by inclining the skirt upwardly in the direction of the outlet. At the same time, the skirt shifts horizontally further removed from the outlet, providing an eccentric area relation on which the acting forces urge the stem in a direction opposite to the drag. Consequently, with this relation the flow encounters reduced resistance passing the skirt towards the outlet while the horizontal shift alters the exposed surface areas whereby to provide a compensating moment maintaining the disc assembly in a direct vertical coaxial alignment. It has been found that the operative skirt position assumed on the disc occurs after the first relief operation of the valve and does not later revert to that set in the initial assembly. Accordingly the skirt ring support structure of the invention has solved a long-standing, expensive and difficult problem associated with such prior art type valves. Moreover the result achieved hereby is far less costly to manufacture than has been associated with maintaining extremely close tolerances and the substitution of hard facing seating materials as have been typical in the prior art.

It is therefore an object of the invention to provide a novel and improved safety relief valve.

It is a further object of the invention to provide an improvement for safety relief valves of the single outlet type in which the difficulties associated with seat wear from pressure misalignment of the disc is substantially overcome if not completely eliminated.

It is a still further object of the invention to effect the aforesaid objects by a relatively inexpensive construction enhancing valve performance as not to require the expensive construction features previously associated with such prior art valves.

It is yet a further object of the invention to provide a novel structure for attaching the annular skirt ring to the valve disc permitting an ultimate assumed operative alignment thereof by movement in response to the forces of flowing fluid pressure being relieved.

Figure 1:
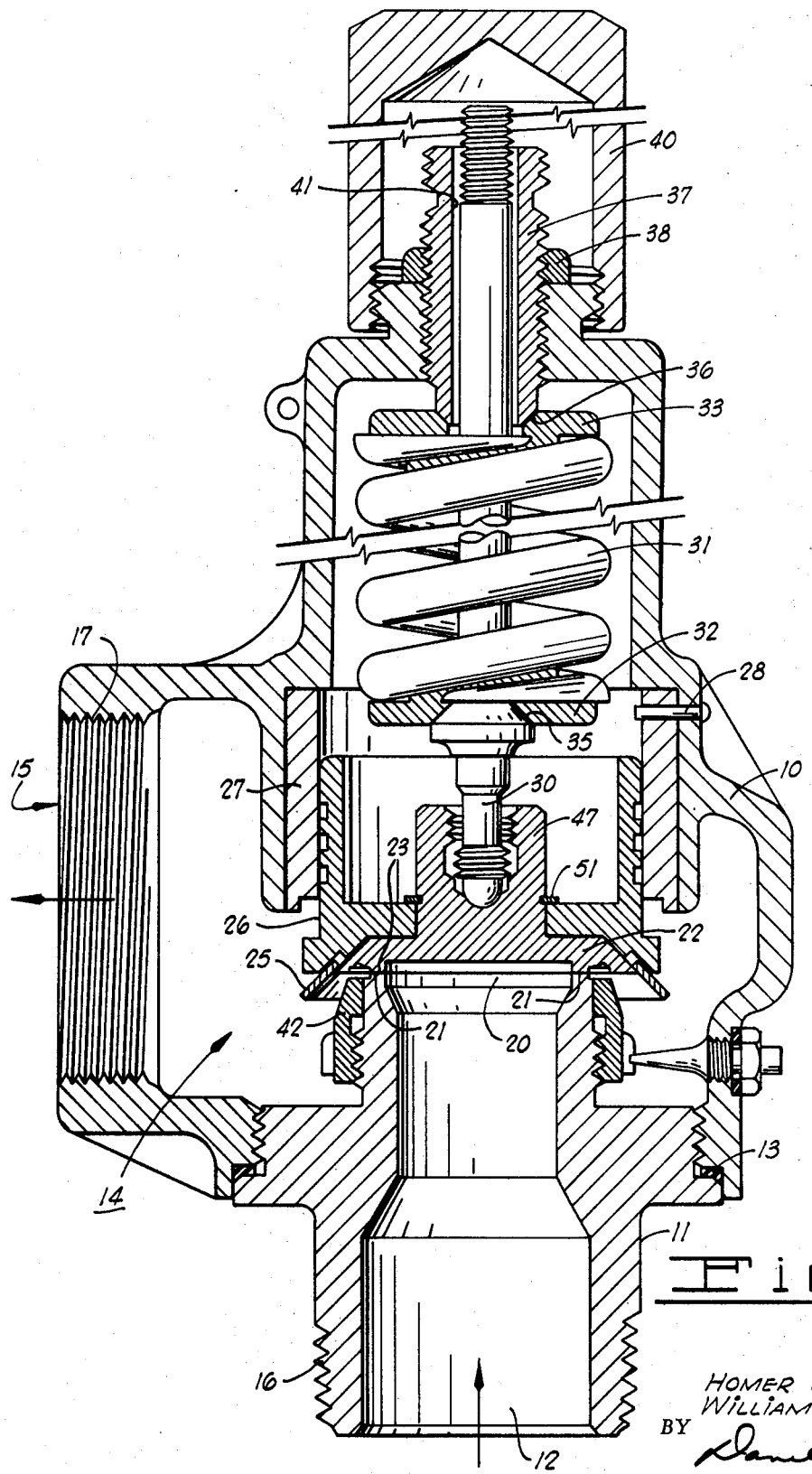
FIG. 1 is a sectional elevation of a safety relief valve of the type incorporating the inventive improvement hereof.

Referring initially to FIG. 1 there is illustrated a safety relief valve of the type in which the invention hereof is incorporated. The valve comprises a bonnet 10 supported on a base 11 providing a bottom inlet passage 12 and maintained pressure tight relation therewith via gasket 13. The inlet communicates with an internal chamber 14 in turn connecting with an outlet passage 15. Threads at 16 and 17 permit mounting the valve in the system with which it is to be employed, it being understood that it is usual to install these valves with the inlet passage with its axis in an accurate vertical alignment from the inlet upward.

The inlet passage 12 therefore extends axially upward to a reduced terminal end section at a primary orifice 20 about which is formed an annular planar extending valve seat 21. Normally closing off the valve seat as to prevent flow therepast to the outlet 15 is a disc 22 having an annular seat 23 formed in its undersurface and which is generally coextensive with valve seat 21 with which it cooperates when in seating position. Supported depending downward from the disc is an annular flared skirt, ring or collar 25 of generally frusto-conical shape encircling the valve seat and attached to the disc in accordance with the invention hereof as will be described below.

The disc 22 includes a shank 47 and is secured within a cylindrical disc holder 26 via retainer ring 51. The disc holder in turn is slidably contained within cylindrical disc guide 27 secured to the bonnet 10 by means of a crosspin 28. Extending centrally disposed upwardly from within the upper portion of disc shank 47 is a coaxial spindle or stem 30. About the stem acting downward thereon is a preloaded coiled spring 31 contained between spring washers 32 and 33 as to constantly urge the disc downwardly into tight seating engagement with seat 21 below. Both spring washers are maintained in coaxial alignment with the stem via conical seats prvoided at 35 on the stem and 36 on adjusting screw 37. The latter screw is threaded to the bonnet permitting pre-setting the compression force to be maintained by spring 31. Screw nut 38 secures the pre-set position of adjusting screw 37 while cap 40, which screws onto the bonnet, prevents dirt from entering stem bore 41 that could ultimately interfere with the intended free operational movement of the stem therein.

When the fluid pressure on the underside of disc 22 at orifice 30 exceeds the force imposed by spring 31, the disc is forcibly moved upwardly away from valve seat 21 to permit fluid flow toward and to the outlet. As the fluid, such as steam, discharges between the disc and seat, it impinges upon the radially outward bottom surface portion of the disc beyond the seat whereat substantially increased surface area is provided against which the fluid reacts to effect lift off of the disc toward full open position. On disc rise toward open position, the skirt or collar 25 moves conjointly therewith and being downwardly dependent, interferes with the fluid flow toward the outlet causing the flow to be redirected downwardly before emerging through outlet passage 15. The latter reaction, as should likewise be appreciated, tends to urge the valve disc in a clockwise direction as viewed in FIG. 1. However, the otherwise beneficial effect of skirt 25 during valve opening and its characteristic operating relationship to presettable adjusting ring 42 to control valve blowdown is well known and has justified its use despite the previous undesirable side effects producing disc offset.

Figure 2:
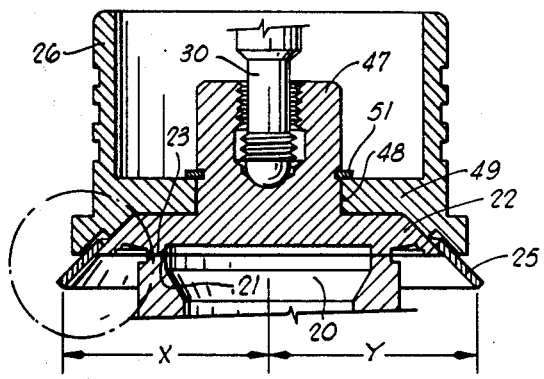
FIG. 2 is a sectional elevation of the valve disc assembly showing the initial attachment of the annular skirt ring thereto.
Figure 3:
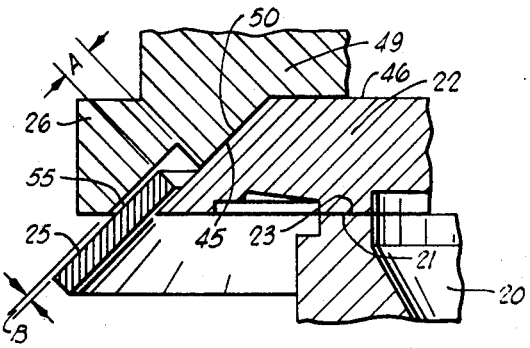
FIG. 3 is a fragmentary enlargement of the encircled portion of FIG. 2.
Figure 4:
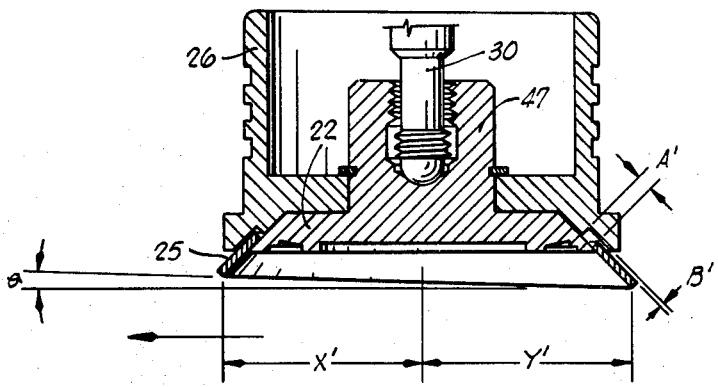
FIG. 4 is a sectional elevation similar to FIG. 2 after the operatively assumed skirt alignment imposed by fluid forces flowing toward the valve outlet.

The compensating skirt feature of the invention will now be described with particular reference to FIGS. 2–4. As can be seen, the disc 22 is frusto-conically shaped with an annular bevel or chamber 45 extending to a radial shoulder or face 46 which terminates at the coaxial cylindrical shank 47. Guide 26 includes a central aperture 48 in a radial wall 49 through which to receive the disc shank secured thereat by retainer ring 51. Guide wall 49, having a complementary bevel 50, accommodates a tight fitting relation of the disc thereto. At the under portion of guide 26 continuing bevel 50, there is provided an annular bevel recess 55 extending concentrically about the corresponding portion of the disc thereat.

During initial assembly of manufacture, collar 25 is dropped over the disc until resting on a lower portion of bevel 45 as to be originally set substantially coaxially concentric therewith. Thereafter shank 47 is placed through aperture 48 to enable securing the disc thereat via retaining ring 51. As originally installed therefore, the assembly results in dimensions X and Y of FIG. 2 that are substantially equal. An annular spacing A of FIG. 3 between the collar top and the uppermost portion of recess 55 and a uniform clearance B between the top collar face and the recess wall are provided sufficient to permit the desired angular and horizontal movement of the skirt.

On the first occasion of use in service, the force of the fluid flowing between the inlet and outlet of the valve reacts against the underside of the collar to tip it upwardly in a clockwise direction as viewed in the figures hereof. This causes the collar to assume an operative position in which its axis is offset with respect to the axis of disc 22 an extent equal to an angle $\theta$ in the range of about 2–5 degrees. Offset less than 2 degrees generally provides inadequate balance compensation while greater offset provides an excess thereof. Preferably, the upper offset limit is reduced to less than 3 degrees usually about 2½ degrees (FIG. 4). Concomitantly with angular offset, the collar is caused to shift or offset horizontally on bevel 45 a substantial amount until dimension X' becomes less than the corresponding dimension Y' producing variable dimension A' and B'. By way of example, for a nominal 2 inch valve size X' becomes about 1.405 inches and Y' about 1.475 inches creating a dimension differential of about 5 percent. This is usually limited not to exceed about 8 percent. In terms of lateral shift from a coaxial relation between disc and collar, these percentages are about halved.

After the offsets have been assumed, the fluid flow encounters decreased resistance on passing those collar portions directly in the path toward the outlet. Moreover, the increased surface area represented by the portion Y' as compared to X' produces a greater force on the former by virtue of the static pressure applied uniformly throughout the disc undersurface. Consequently the greater force on the area of Y' produces a compensating moment urging the assembly in a counterclockwise direction. The opposing moments thereby cancel each other with the result that the disc assembly during the course of vertical movement is maintained in a direct coaxial alignment with the axis inlet of passage 12 ensuring uniform seating of the disc onto seat 21 during the closure cycle. By this simple yet effective construction of attaching the collar 25 to the disc 22, it has resolved the problem of disc wear which has plagued the industry for many years.

By the above description there is disclosed a novel improvement for a safety relief valve by which the prior art problem associated with seat wear from fluid-caused misalignment of the disc has been substantially reduced if not completely eliminated. The construction is both simple and inexpensive as compared to prior art alternatives seeking the same or compensating results with consequent reduced or eliminated maintenance requirements previously unknown.

Since many changes could be made in the above construction and many apparently widely different embodiments of this invention could be made without departing from the scope thereof, it is intended that all matter contained in the drawings and specification shall be interpreted as illustrative and not in a limiting sense.

What is claimed is:

1. In a safety relief valve including a body defining a fluid passage between an inlet and an outlet axially offset from each other, an annular seat surrounding said passage at an intermediate location thereof, and a disc movable from between an urged first position engaging said seat to prevent fluid therepast toward a second position removed from said seat to permit fluid flow to the outlet in response to a fluid over-pressure, the improvement comprising:

(a) an annular skirt; and
(b) skirt support means supporting said skirt for movement with said disc and dependent therefrom to surround said seat at least when said disc is in said first position;
(c) said skirt support including means permitting pressure responsive shiftable realignment of the skirt thereon for said skirt to assume a generally retainable operative position relative to the axis of said disc in at least partial response to the fluid forces encountered when said disc is moved to said second position.

2. In the safety relief valve according to claim 1 in which said skirt support means includes means for said skirt to assume an operative position angularly offset relative to the axis of said disc in the same general direction as the relative axial offset between the outlet and inlet body passages.

3. In the safety relief valve according to claim 2 in which said angular offset is maintained in the range of between two degrees to five degrees.

4. In the safety relief valve according to claim 3 in which said angular offset is maintained less than at least three degrees.

5. In the safety relief valve according to claim 2 in which said skirt support also includes means for said skirt to assume an operative position increasingly removed from the outlet of said passage than when initially in said first position.

6. In the safety relief valve according to claim 5 in which said removal is a dimensional amount up to about four percent of the skirt radius.

7. In the safety relief valve according to claim 6 in which said angular offset is maintained at least less than three degrees.

8. In the safety relief valve according to claim 5 in which said skirt is a ring of frusto-conical section at least where supported overlying a frusto-conical surface portion of said disc extending toward apices in a direction away from said seat.

9. In a safety relief valve including a body defining a fluid passage between an inlet and an outlet axially offset from each other, an annular seat surrounding said passage at an intermediate location thereof, and a disc movable from between an urged first position engaging said seat to prevent fluid flow therepast toward a second position removed from said seat to permit fluid flow to the outlet in response to a fluid over-pressure, the improvement comprising:

(a) an annular skirt; and
(b) skirt support means supporting said skirt for movement with said disc and arranged operatively set relative thereto with their axes angularly offset to each other in the range of between two degrees to five degrees, said angular offset being maintained on said support means in all ranges of movement of said disc, said skirt on its support means extending dependend therefrom to surround said seat at least when said disc is in said first position.

10. In the safety relief valve according to claim 9 in which said angular offset is maintained less than at least three degrees.

11. In the safety relief valve according to claim 9 in which said skirt support also supports said skirt positioned with a greater area extent located behind the disc axis relative to said outlet.

12. In the safety relief valve according to claim 11 in which said skirt is a ring of frusto-conical section at least where supported overlying a frusto-conical surface portion of said disc extending toward apices in a direction away from said seat.

References Cited

UNITED STATES PATENTS

| 1,868,138 | 7/1932 | Fisk | 137—469 XR |
| 2,351,190 | 6/1944 | Carlson | 137—469 XR |
| 2,754,841 | 7/1956 | Eddy | 137—469 |

FOREIGN PATENTS 176,037  2/1922  Great Britain.

HAROLD W. WEAKLEY, Primary Examiner

U.S. Cl. X.R.

137—478